June 26, 1923.
J. G. HUGHES
PNEUMATIC SPRING
Filed April 6, 1922.
1,459,892
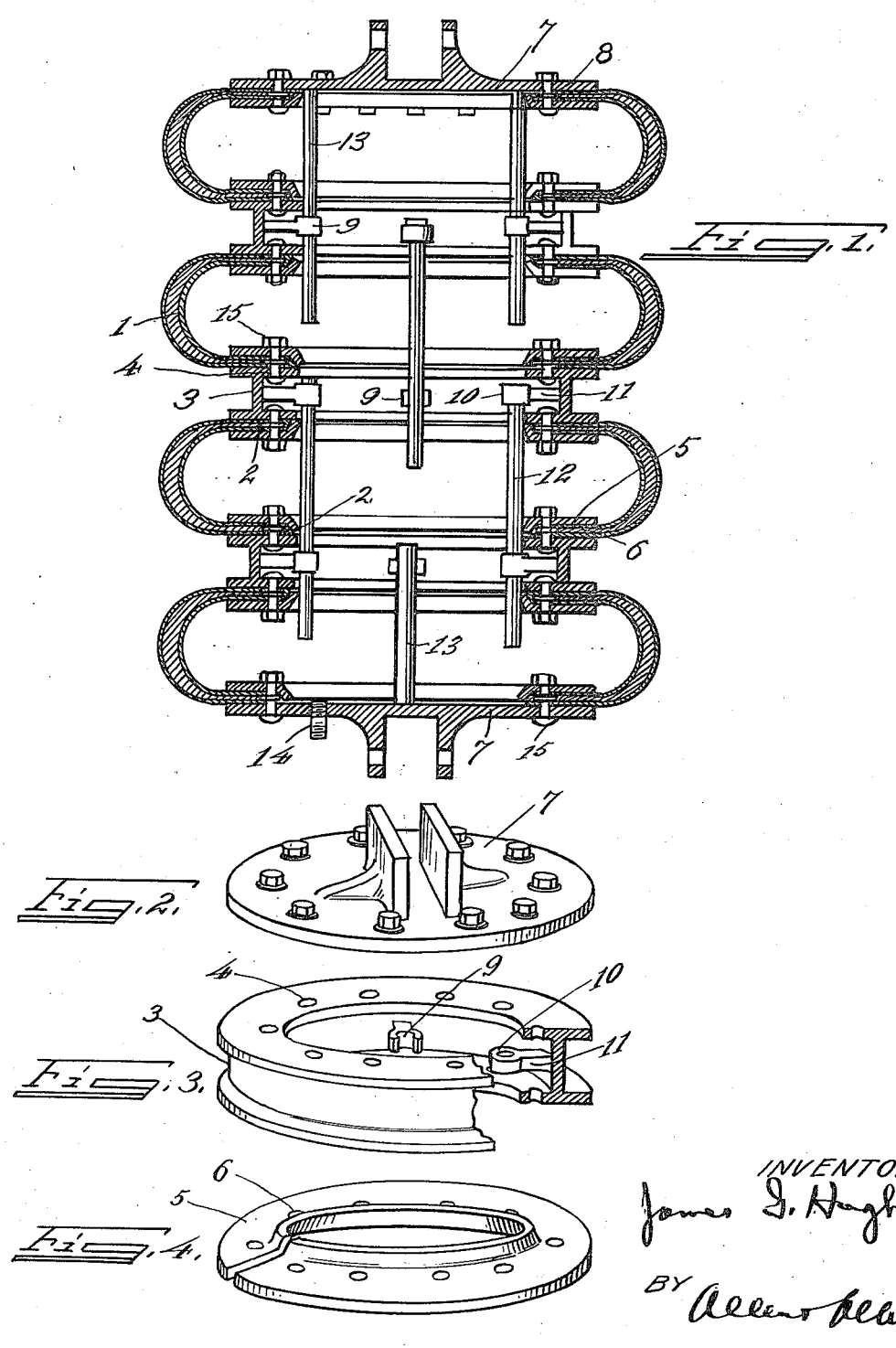

Patented June 26, 1923.

1,459,892

UNITED STATES PATENT OFFICE.

JAMES G. HUGHES, OF CINCINNATI, OHIO.

PNEUMATIC SPRING.

Application filed April 6, 1922. Serial No. 550,020.

*To all whom it may concern:*

Be it known that I, JAMES G. HUGHES, a citizen of the United States, and a resident of Cincinnati, in the county of Hamilton and State of Ohio, have invented a certain new and useful Pneumatic Spring, of which the following is a full, clear, and exact description, reference being had to the accompanying drawings, forming part of this specification.

My invention relates to pneumatic springs by which is meant a device which is resilient of itself or at least flexible and acts to confine a body of air in such a way as to compress and expand the air in a spring-like manner.

It is the object of my invention to utilize the principle of operation of the ordinary pneumatic vehicle tire, to form a pneumatic spring. So far as I am advised no one in the past has attempted to do this.

I preferably employ a number of tire-like rings in a pile suitably confined together. In connection with this it is my object to provide suitable spacer rings, and clamping devices for assembling the pneumatic rubber ring-like elements. It is also my object to provide a simple form of guide to be used in connection therewith.

As is well known, the pneumatic tire is the best form of support for a vehicle and if it were not for the danger of puncture, bruises, and surface wear, a large, partially inflated, pneumatic rubber tire would act as sufficient spring for a vehicle. By utilizing this principle of the tire in a compound unit, it is my object to provide a device to be used particularly as a support for vehicle bodies on their frames, which device is thus removed from all road or surface injury.

The above objects I accomplish by that certain construction and arrangement of parts to be hereinafter more specifically pointed out and claimed.

In the drawings,

Figure 1 is a central vertical section taken through a device constructed on the principle of my invention.

Figure 2 is a perspective view of a form of top cap.

Figure 3 is a like view of a form of spacer ring.

Figure 4 is a like view of a form of split, retaining ring.

It will be noted that the essential portion of my device lies in a series of rings 1 of rubber and fabric constructed as a vehicle tire with an arch cross section and with flanges 2, 2, which are used for purposes of mounting.

The spacer rings 3 are I-shaped in cross section and at the inner flange at both top and bottom the rings are formed with interspaced holes 4.

The split retaining rings 5 are formed so as to fit within each pneumatic ring and of a size so that the inner portions thereof lie within the inner line of the flange 2 of the pneumatic rings. These split rings have likewise a series of interspaced holes 6.

The top and bottom plates (which I have shown without any particular mounting means) are in the form of disks 7 having interspaced holes 8.

The spacer rings 3 are formed with forks 9, 9, extending inwardly and opposite to each other and with socket pieces 10, 10, on lugs 11 extending inwardly and opposite to each other. In the sockets are placed guide rods 12, 12, which lie within the forks of the next adjacent ring.

The top and bottom plates are formed with rods 13, 13, corresponding to the rods 12, said rods likewise adapted to lie in the forks of the next adjacent spacer rings. I have shown a portion 14, which is intended to represent a valve for inflating the device, as desired.

The portions are assembled as follows. A split ring is inserted into the top and bottom of each tire-like pneumatic ring and spacer rings bolted with bolts 15 thereto. The spacer rings are set so that the rods and forks coincide each ring in the form shown being turned around at right angles to the one above it. The end plates are bolted to the upper and lower split rings and in the act of bolting on the end plates, the guide rods are set to slide in the forks of the spacer rings next to them.

The device may then be filled with air under pressure, if desired, or if used as a shock absorber may be equipped with a bleed valve located as at 14.

In either case the device may be inserted between the frame and the body of a vehicle and used as the support for the body.

When a shock comes the tire-like rings will be flattened down partially and the air within the structure compressed. The rings and the air will both tend to re-expand the structure to its original shape as soon as the strain is removed, which will be rapidly or slowly as the case may be.

The force of compression and the greatest strength in expansion will be when the device is most highly compressed, which is just what is desired for a vehicle support, since it is sensitive to slight jars and on a heavy jar will move slowly at the top of its stroke, thereby imparting an easy riding action. It will be evident that the members 1 may be merely flexible instead of resilient and flexible.

I have not attempted to do more than show one form of device operating on the principle of my invention, and do not wish to be limited in any way because of my failure to show and describe such modifications as occur to me.

Having thus described my invention, what I claim as new and desire to secure by Letters Patent, is:—

1. In a pneumatic spring device, the combination with a pneumatic tire casing of resilient material, of closing members for confining said ring lying across the axial opening therein at both sides thereof, so as to confine a body of air between the closing members, said air space being confined at its periphery by the casing.

2. In a pneumatic spring device, the combination with a plurality of pneumatic tire casings of resilient material, of spacer members between the casings to connect them axially and end closures, said parts being formed to confine a body of air, confined at its end by the end closures, and confined at its periphery by the pneumatic tire casings.

3. In a pneumatic spring device, the combination of a plurality of tire-like rings of resilient material, of spacer members between the rings to connect them axially and end closures, said parts being formed to confine a body of air, confined at its end by the end closures, and confined at its periphery by the tire-like rings, and guiding means acting between the spacer rings for maintaining a rectilinear condition thereof.

4. In a pneumatic spring device, the combination with a plurality of tire-like rings formed of resilient flexible material, such as rubber and canvas, spacer rings I-shaped in cross section adapted to lie against the outer face of the flanges of each tire-like ring, end plates to close the space across the flanges of the terminal tire-like rings of a pile, and split rings inserted inside of each flange of the tire-like rings and bolted to the spacer rings and end plates for the purpose described.

5. In a pneumatic spring device, the combination with a plurality of tire-like rings formed of resilient flexible material, such as rubber and canvas, spacer rings I-shaped in cross section adapted to lie against the outer face of the flanges of each tire-like ring, end plates to close the space across the flanges of the terminal tire-like rings of a pile, and split rings inserted inside of each flange of the tire-like rings and bolted to the spacer rings and end plates and guide rods and rod engaging means mounted within the device to maintain a rectilinear condition thereof, for the purpose described.

JAMES G. HUGHES.